(12) United States Patent
Nobata

(10) Patent No.: US 11,258,077 B2
(45) Date of Patent: Feb. 22, 2022

(54) FUEL CELL SEPARATOR, METHOD FOR PRODUCING THE SAME, AND APPARATUS FOR PRODUCING THE SAME

(71) Applicant: TOYOTA JIDOSHA KABUSHIKI KAISHA, Toyota (JP)

(72) Inventor: Yasuhiro Nobata, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 217 days.

(21) Appl. No.: 16/598,326

(22) Filed: Oct. 10, 2019

(65) Prior Publication Data
US 2020/0127303 A1 Apr. 23, 2020

(30) Foreign Application Priority Data
Oct. 18, 2018 (JP) .............................. JP2018-196508

(51) Int. Cl.
*H01M 8/026* (2016.01)
*H01M 8/0223* (2016.01)
*H01M 8/1004* (2016.01)
*H01M 8/0254* (2016.01)
*H01M 8/10* (2016.01)

(52) U.S. Cl.
CPC ......... *H01M 8/026* (2013.01); *H01M 8/0223* (2013.01); *H01M 8/0254* (2013.01); *H01M 8/1004* (2013.01); *H01M 2008/1095* (2013.01)

(58) Field of Classification Search
CPC ............................ H01M 8/0254; H01M 8/026
USPC .......................................................... 429/483
See application file for complete search history.

(56) References Cited

U.S. PATENT DOCUMENTS

| | | | |
|---|---|---|---|
| 2002/0168562 A1 | 11/2002 | Funatsu et al. | |
| 2013/0177827 A1 | 7/2013 | Okabe et al. | |
| 2015/0132680 A1* | 5/2015 | Asano | H01M 8/0265 429/482 |
| 2018/0375113 A1* | 12/2018 | Kinpara | H01M 8/026 |
| 2019/0103617 A1* | 4/2019 | Nakayama | H01M 8/04156 |
| 2019/0221867 A1* | 7/2019 | Gambini | H01M 8/026 |
| 2019/0296371 A1* | 9/2019 | Ichihara | H01M 8/0271 |

(Continued)

FOREIGN PATENT DOCUMENTS

| | | |
|---|---|---|
| JP | 2002075401 A | 3/2002 |
| JP | 2006-054198 A | 2/2006 |
| JP | 2013-257946 A | 12/2013 |

(Continued)

*Primary Examiner* — James M Erwin
(74) *Attorney, Agent, or Firm* — Dickinson Wright, PLLC

(57) ABSTRACT

A fuel cell separator capable of surely discharging produced water, and a method and apparatus for producing the same. The fuel cell separator is formed in a wave shape with recesses and projections alternately arranged in a first direction, the recesses forming reactant gas channels together with a membrane electrode assembly and the projections abutting the membrane electrode assembly, in which on a surface of the fuel cell separator that is adapted to face the membrane electrode assembly, a plurality of first grooves extending in the first direction along the corrugation of the recesses and projections is disposed at intervals from each other in a second direction orthogonal to the first direction, and a second groove extending in the second direction and communicating with the plurality of first grooves is disposed in the bottom portion of each recess.

4 Claims, 9 Drawing Sheets

(56) References Cited

U.S. PATENT DOCUMENTS

2019/0363371 A1* 11/2019 Kawabe ................ H01M 8/026

FOREIGN PATENT DOCUMENTS

| WO | 2012/035585 A1 | 3/2012 | | |
|---|---|---|---|---|
| WO | WO-2014039048 A1 * | 3/2014 | ........ | H01M 8/04156 |

* cited by examiner

Fig. 1
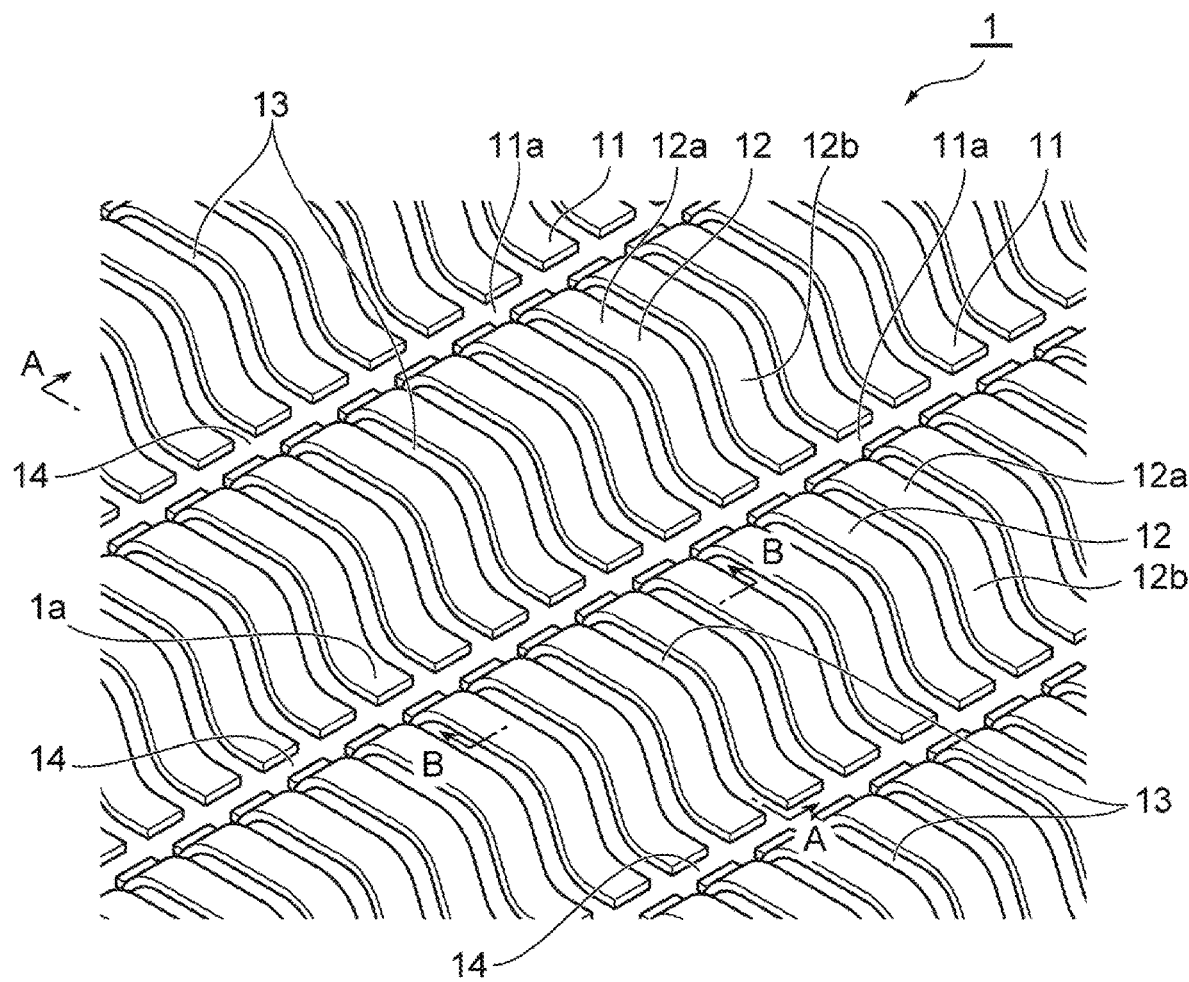
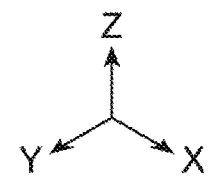

Fig. 8
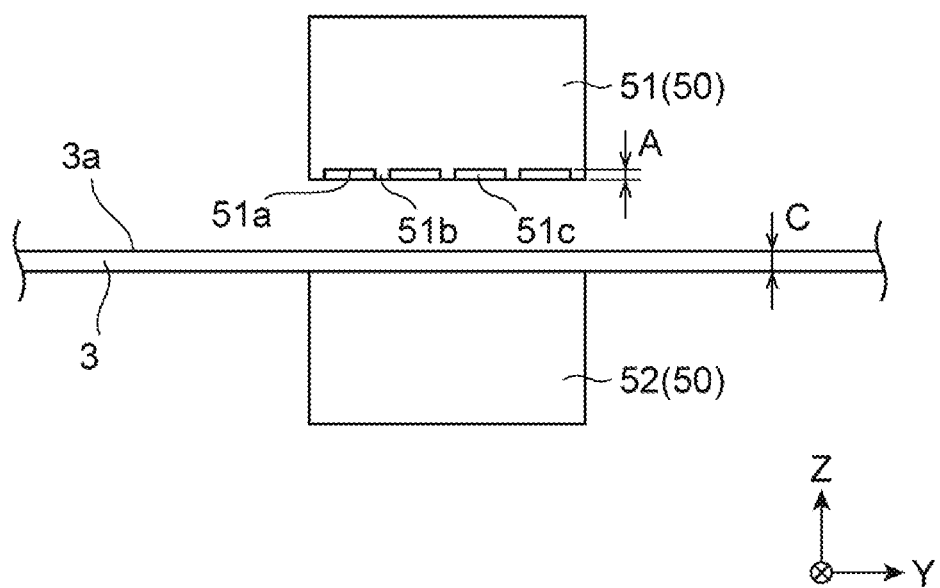
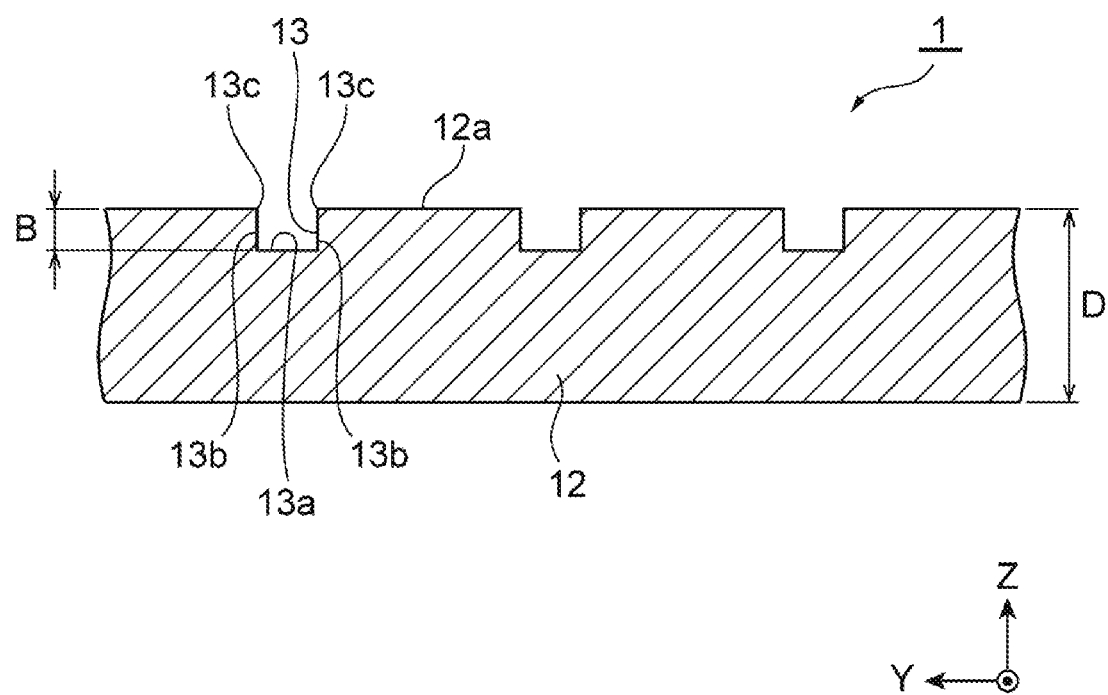

FUEL CELL SEPARATOR, METHOD FOR PRODUCING THE SAME, AND APPARATUS FOR PRODUCING THE SAME

CROSS REFERENCE TO RELATED APPLICATIONS

The present application claims priority from Japanese patent application JP 2018-196508 filed on Oct. 18, 2018, the content of which is hereby incorporated by reference into this application.

BACKGROUND

Technical Field

The present disclosure relates to a fuel cell separator, a method for producing the same, and an apparatus for producing the same.

Background Art

Fuel cell devices are formed by stacking a plurality of fuel cells and generate power through electrochemical reactions of supplied reactant gases (that is, an oxidant gas and a fuel gas). A fuel cell that has been known includes a membrane electrode assembly, which includes an electrolyte membrane and a pair of electrodes sandwiching the electrolyte membrane, and a pair of fuel cell separators sandwiching the membrane electrode assembly. The fuel cell separators are each formed in a wave shape with recesses and projections alternately arranged, the recesses forming reactant gas channels together with the membrane electrode assembly and the projections abutting the membrane electrode assembly.

The fuel cell devices with such a structure have a problem in that a reactant gas cannot easily enter portions where the projections (more specifically, top portions of the projections) of the fuel cell separators abut the membrane electrode assembly, and therefore, produced water tends to collect there. To solve such a problem, various techniques have been proposed. WO 2012/035585 A1, for example, describes forming shallow groove sections for the flow of a reactant gas in the top portions of the projections of the fuel cell separators so as to facilitate entering of the reactant gas thereinto, thereby discharging produced water. Further, JP 2013-257946 A describes forming drainage grooves that couple together adjacent reactant gas channels in the top portions of the projections of the fuel cell separators so as to facilitate drainage of produced water.

SUMMARY

The fuel cell separators described in the aforementioned patent documents have some advantages in discharging produced water, but still need to be improved.

The present disclosure has been made in view of the foregoing, and provides a fuel cell separator capable of surely discharging produced water, and a method and apparatus for producing the same.

The present disclosure provides a fuel cell separator that is adapted to partially abut a membrane electrode assembly and is formed in a wave shape with recesses and projections alternately arranged in a first direction, the recesses forming reactant gas channels together with the membrane electrode assembly and the projections abutting the membrane electrode assembly, in which on a surface of the fuel cell separator that is adapted to face the membrane electrode assembly, a plurality of first grooves extending in the first direction along the corrugation of the recesses and projections is disposed at intervals from each other in a second direction orthogonal to the first direction, and a second groove extending in the second direction and communicating with the plurality of first grooves is disposed in the bottom portion of each recess.

In the fuel cell separator according to the present disclosure, since the plurality of first grooves extending in the first direction along the corrugation of the recesses and projections is disposed at intervals from each other in the second direction orthogonal to the first direction, produced water in portions where the projections of the fuel cell separator abut the membrane electrode assembly can be discharged utilizing the capillary action of the first grooves. In addition, since the second groove extending in the second direction and communicating with the plurality of first grooves is disposed in the bottom portion of each recess of the fuel cell separator, the produced water flowing through the first grooves flows into the second groove and is discharged along with the flow of a reactant gas. As a result, the produced water can surely be discharged.

In some embodiments of the fuel cell separator according to the present disclosure, the first grooves and the second grooves are coupled together with no difference in level therebetween at locations where they communicate with each other. With such a structure, the produced water flowing through the first grooves can smoothly flow into the second grooves, thereby preventing collection of the produced water at the locations where the first grooves and the second grooves communicate with each other.

A method for producing the fuel cell separator according to the present disclosure includes forming a plurality of first grooves and a plurality of second grooves, the plurality of first grooves extending in a first direction and disposed at first intervals from each other in a second direction orthogonal to the first direction, and the plurality of second grooves extending in the second direction and disposed at second intervals greater than the first intervals from each other in the first direction and communicating with the plurality of first grooves, and forming recesses and projections so that the recesses and projections are alternately arranged in the first direction, in which in the forming of the recesses and projections, the recesses and projections are formed such that each second groove is positioned in the bottom portion of each recess.

Since the method for producing the fuel cell separator according to the present disclosure includes forming the first grooves and second grooves on one surface of a plate-like separator substrate and subsequently forming the recesses and projections, material used for the forming is less moved as compared to when all of the first grooves, second grooves, recesses, and projections are formed in a single step. This can reduce abrasion of dies for use in the forming, leading to extend lives of dies. Moreover, the aforementioned production method can realize more accurate dimensions of the first grooves, second grooves, recesses, and projections to be formed.

An apparatus for producing the fuel cell separator according to the present disclosure is adapted to form a plurality of grooves on one surface of a plate-like separator substrate by press-forming the separator substrate with a die, in which the die includes a facing surface that is to face the one surface of the separator substrate and projections projecting from the facing surface toward the separator substrate, the projections being adapted to form the grooves.

In the apparatus for producing the fuel cell separator according to the present disclosure, since the die has the facing surface that is adapted to face one surface of the separator substrate and the projections that project from the facing surface toward the separator substrate and are adapted to form the grooves, the grooves can easily be formed on the separator substrate.

In some embodiments of the apparatus for producing the fuel cell separator according to the present disclosure, provided that the height of each projection projecting from the facing surface is represented as A, the depth of each groove of the fuel cell separator to be produced is represented as B, the thickness of the separator substrate is represented as C, and the thickness of the fuel cell separator to be produced is represented as D, an equation $A=B+(C-D)$ is satisfied. When the equation is satisfied, an opening rim of each groove of the fuel cell separator to be produced has a substantially right angle. Thus, when the fuel cell separator is placed in partial abutment with a membrane electrode assembly, entering of the membrane electrode assembly into the grooves can be suppressed. Therefore, the grooves can be prevented from being clogged by the membrane electrode assembly, so that the produced water can surely be discharged.

In the present disclosure, produced water can surely be discharged.

BRIEF DESCRIPTION OF THE DRAWINGS

FIG. 1 is a partial perspective view of a fuel cell separator according to an embodiment;

FIG. 8 are views illustrating the dimensions of a first projection of the upper die.

DETAILED DESCRIPTION

Embodiments of a fuel cell separator according to the present disclosure and a method and apparatus for producing the same will be described below with reference to the drawings.

[Fuel Cell Separator]

Figure 2:
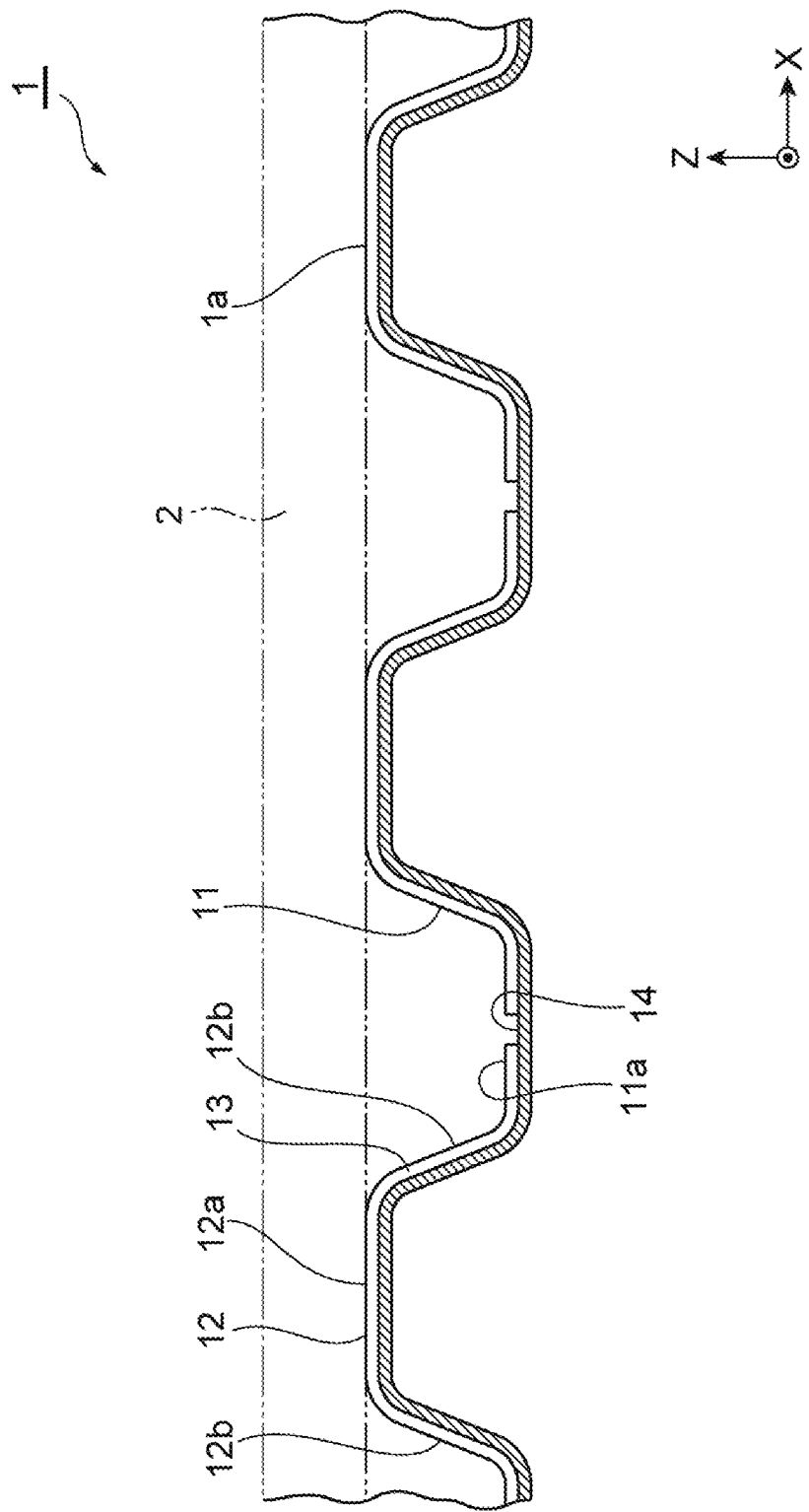
FIG. 2 is a cross-sectional view of the fuel cell separator taken along line A-A of FIG. 1.
Figure 3:
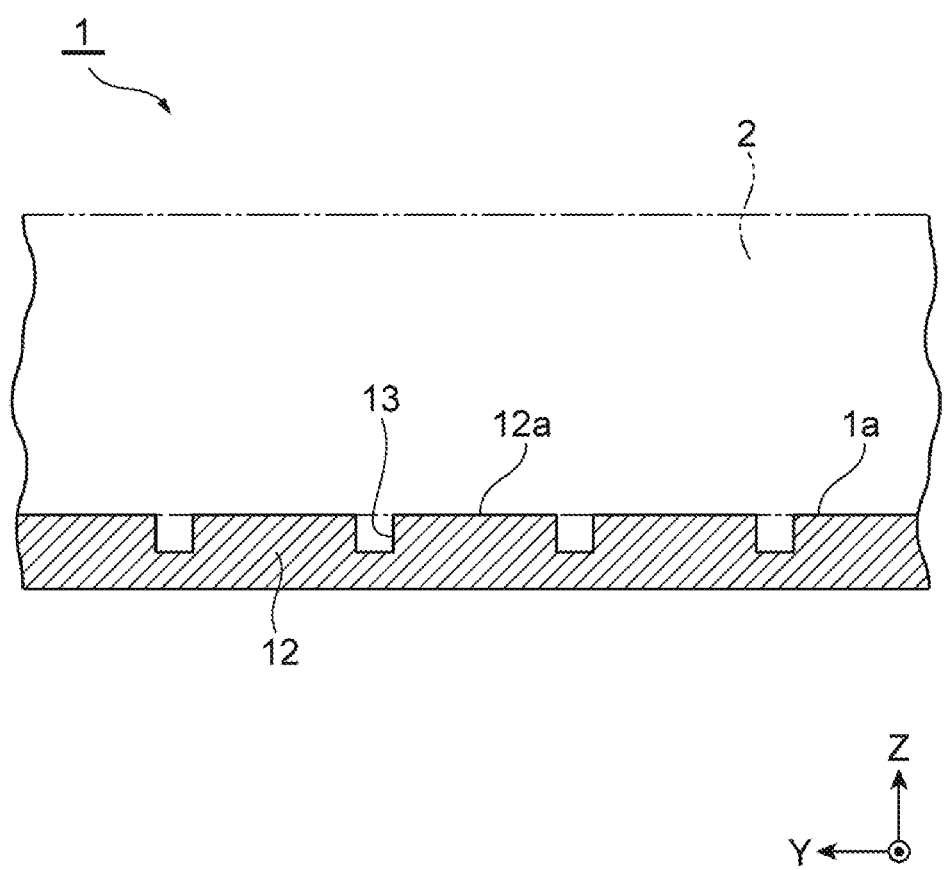
FIG. 3 is a cross-sectional view of the fuel cell separator taken along line B-B of FIG. 1.

FIG. 1 is a partial perspective view of a fuel cell separator according to an embodiment, FIG. 2 is a cross-sectional view of the fuel cell separator taken along line A-A of FIG. 1, and FIG. 3 is a cross-sectional view of the fuel cell separator taken along line B-B of FIG. 1. In the drawings, the width direction, longitudinal direction, and thickness direction (also referred to as the up-down direction) of the fuel cell separator are represented as a first direction X, a second direction Y, and a third direction Z, respectively. Further, in FIG. 2 and FIG. 3, for easy understanding of the positional relation between the fuel cell separator and a membrane electrode assembly, the membrane electrode assembly is also shown (see a portion depicted with a two-dot chain line) for reference.

Fuel cell separators 1 of the present embodiment form a fuel cell together with a rectangular plate-like membrane electrode assembly 2 while sandwiching the membrane electrode assembly 2 from its opposite sides. Each fuel cell separator 1 is formed in a wave shape with recesses 11 and projections 12 alternately arranged in the first direction X, the recesses 11 forming reactant gas channels together with the membrane electrode assembly 2 and the projections 12 abutting the membrane electrode assembly 2.

Although not shown, the membrane electrode assembly 2 includes an electrolyte membrane and a pair of electrodes joined together so as to sandwich the electrolyte membrane. Further, the fuel cell separators 1 are adapted to sandwich the membrane electrode assembly 2 from its opposite sides with top portions 12a of the projections 12 in abutment with the electrodes of the membrane electrode assembly 2. When the membrane electrode assembly 2 is further provided with a pair of gas diffusion layers on its opposite sides, the membrane electrode assembly 2 and the pair of gas diffusion layers form a membrane electrode and gas diffusion layer assembly. In the case of the membrane electrode and gas diffusion layer assembly, the fuel cell separators 1 are adapted to sandwich the membrane electrode assembly 2 from its opposite sides, via the gas diffusion layers, with the top portions 12a of the projections 12 in abutment with the gas diffusion layers.

A plurality of first grooves 13 extending in the first direction X along the corrugation of the recesses 11 and projections 12 are disposed at intervals from each other in the second direction Y orthogonal to the first direction X, on a surface 1a of the fuel cell separator 1 that faces the membrane electrode assembly 2. Further, a second groove 14 extending in the second direction Y and communicating with the plurality of first grooves 13 is disposed in a bottom portion 11a of each recess 11 on the surface 1a.

More specifically, each first groove 13 extends along the projections 12 and recesses 11 alternately arranged, such that it descends an inclined side wall portion 12b, which is continuous with and extending downward from the top portion 12a of each projection 12, from the top portion 12a, passes the bottom portion 11a of each recess 11, which is continuous with the inclined side wall portion 12b, and further, ascends the inclined side wall portion 12b of the adjacent projection 12, and reaches the top portion 12a of the adjacent projection 12. Further, each first groove 13 intersects and communicates with the second groove 14 disposed in the bottom portion 11a of each recess 11 as it passes the bottom portion 11a. As shown in FIG. 1, the plurality of first grooves 13 are arranged regularly at a predetermined interval from each other in the second direction Y.

The first grooves 13 and second grooves 14 are formed in a grid, when the fuel cell separator 1 is seen in the direction normal to the surface 1a thereof. Further, the interval between the adjacent first grooves 13 is smaller than that between the adjacent second grooves 14.

Each of the first grooves 13 and second grooves 14 is a so-called microgroove with a rectangular cross section. As an example of each groove, the first groove 13 and second groove 14 are each formed so as to have a width of 0.1 mm (the widths of each first groove 13 and each second groove 14 correspond to the dimensions in the second direction Y and in the first direction X, respectively) and a depth of 0.01 mm (that is, the dimension in the third direction Z). The projections 12 and recesses 11 are alternately coupled to each other, and thus share the inclined side wall portions 12b of the projections 12.

Further, as shown in FIG. 1 and FIG. 2, the first grooves 13 and the second grooves 14 are coupled together with no difference in level therebetween at locations where they communicate with each other. Herein, the expression "with no difference in level" indicates that the lowermost ends of the first grooves 13 and the bottom faces of the second grooves 14 are positioned at the same height in the third direction Z.

In the fuel cell separator 1 formed as such, since the plurality of first grooves 13 extending in the first direction X along the corrugation of the recesses 11 and projections 12 are disposed at intervals from each other in the second direction Y orthogonal to the first direction X, produced water in portions where the top portions 12a of the projections 12 of the fuel cell separator 1 abut the membrane electrode assembly 2 can be discharged, utilizing the capillary action of the first grooves 13, for example. In addition, since the second grooves 14 extending in the second direction Y and communicating with the plurality of first grooves 13 are disposed in the bottom portions 11a of the recesses 11 of the fuel cell separator 1, produced water flowing through the first grooves 13 flows into the second grooves 14 and is discharged along with the flow of a reactant gas. As a result, the produced water can surely be discharged.

Moreover, since the first grooves 13 and second grooves 14 are coupled together with no difference in level therebetween at locations where they communicate with each other, the produced water flowing through the first grooves 13 can smoothly flow into the second grooves 14, and the produced water can be prevented from collecting at the locations where they communicate with each other. Therefore, degradation in power generation performance due to collection of the produced water can be prevented.

[Method and Apparatus for Producing Fuel Cell Separator]

Figure 4:
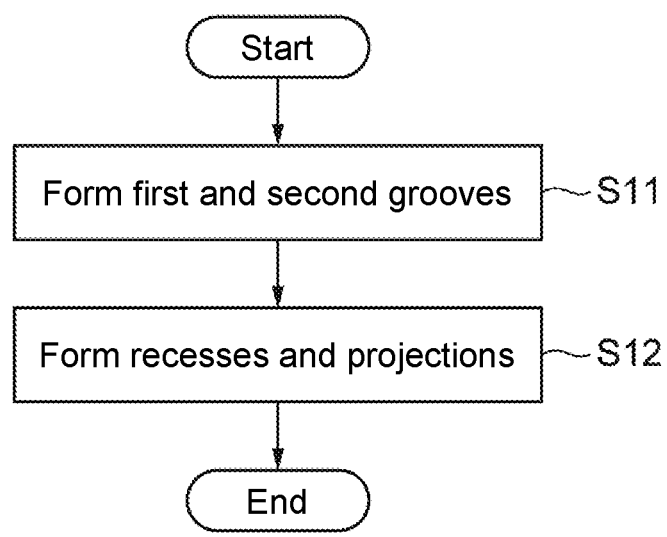
FIG. 4 is a flowchart of a method for producing the fuel cell separator.

A method and apparatus for producing the fuel cell separator 1 will be described below with reference to FIG. 4 to FIG. 6.

A method for producing the fuel cell separator 1 includes a first step S11 of forming the plurality of first grooves 13 and the plurality of second grooves 14, the plurality of first grooves 13 extending in a first direction and disposed at first intervals from each other in a second direction orthogonal to the first direction, and the plurality of second grooves 14 extending in the second direction and disposed at second intervals greater than the first intervals from each other in the first direction and communicating with the plurality of first grooves 13, and a second step S12 of forming the recesses 11 and projections 12 such that they are alternately arranged in the first direction.

Figure 5:
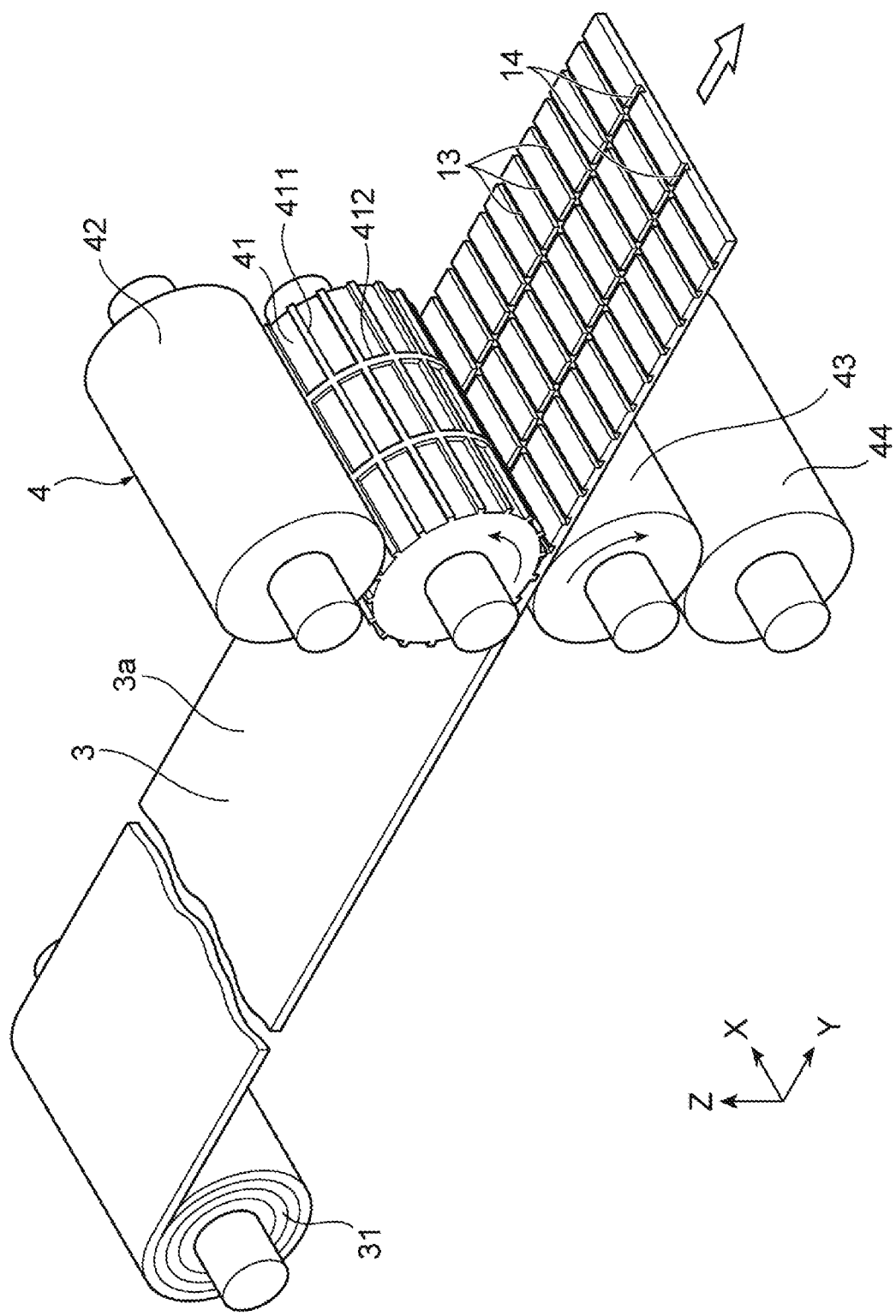
FIG. 5 is a schematic cross-sectional view illustrating the method and an apparatus for producing the fuel cell separator.
Figure 6:
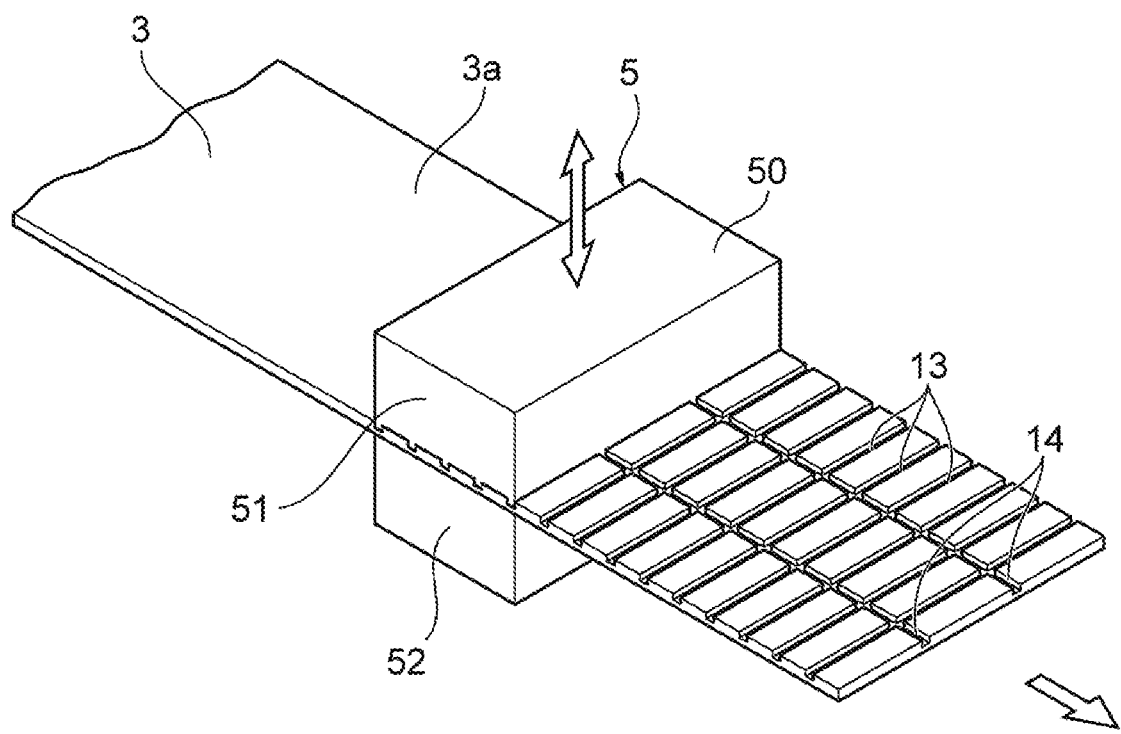
FIG. 6 is a schematic cross-sectional view illustrating the method and an apparatus for producing the fuel cell separator.

In the first step S11, an apparatus for producing the fuel cell separator shown in FIG. 5 or FIG. 6 is used, for example. An apparatus 4 for producing the fuel cell separator (hereinafter abbreviated as a producing apparatus 4) shown in FIG. 5 is suitable for forming the fuel cell separator from coiled material 31, or a separator substrate 3 in a roll, and is adapted to form the first grooves 13 and second grooves 14 continuously on an upper surface 3a of the separator substrate 3. The producing apparatus 4 includes an upper forming roll 41 and upper backup roll 42 that are positioned on the upper side of the separator substrate 3 and a lower forming roll 43 and lower backup roll 44 that are positioned on the lower side of the separator substrate 3. Examples of the separator substrate 3 include metal plates made of stainless steel and titanium.

A projection pattern used for forming the first grooves 13 and second grooves 14 is provided on the outer circumferential surface of the upper forming roll 41. More specifically, the outer circumferential surface of the upper forming roll 41 is provided with a plurality of first projecting strip sections 411 for forming the first grooves 13 that extend in the longitudinal direction of the upper forming roll 41, and a plurality of second projecting strip sections 412 for forming the second grooves 14 that extend in the circumferential direction of the upper forming roll 41. The first and second projecting strip sections 411 and 412 intersect with each other. Meanwhile, the outer circumferential surface of the lower forming roll 43 is flat.

The upper backup roll 42 is disposed on the upper side of the upper forming roll 41 to regulate the position of the upper forming roll 41, while the lower backup roll 44 is disposed on the lower side of the lower forming roll 43 to regulate the position of the lower forming roll 43. Such arrangements of the upper backup roll 42 and lower backup roll 44 can prevent deviation of the upper forming roll 41 and lower forming roll 43, and thus, can ensure the accurate dimensions of the first grooves 13 and second grooves 14 to be formed.

It should be noted that although in the present embodiment, the upper forming roll 41 has a projection pattern, while the opposing lower forming roll 43 has a flat surface, the upper and lower forming rolls 41 and 43 may be formed in the opposite manner, as appropriate.

When the producing apparatus 4 with such a structure is used to form the first grooves 13 and second grooves 14, the separator substrate 3 is first withdrawn, by means of a coil feeder (not shown), from the coiled material 31 secured to a coil stand (not shown) and is then sent to the producing apparatus 4. The producing apparatus 4 sandwiches the received separator substrate 3 with the upper and lower forming rolls 41 and 43. Then, patterns of the first and second projecting strip sections 411 and 412 provided on the upper forming roll 41 are transferred to the upper surface 3a of the separator substrate 3 so that the first grooves 13 and second grooves 14 are formed thereon (see FIG. 5). The upper surface 3a of the separator substrate 3 corresponds to the surface 1a of the fuel cell separator 1 to be produced.

To ensure accurate positioning of the second grooves 14 in the bottom portions 11a of the recesses 11 in the second step S12 to be performed later, in forming the first grooves 13 and second grooves 14 on the upper surface 3a of the separator substrate 3, positioning holes may be provided in the coiled material 31, for example. Meanwhile, positioning pins that are correspondingly insertable into the positioning holes may also be provided in a press to be used in the second step S12, so that the second grooves 14 may be positioned making use of the corresponding positioning pins and holes.

Meanwhile, an apparatus 5 for producing the fuel cell separator (hereinafter abbreviated as a producing apparatus 5) shown in FIG. 6 is suitable for forming the fuel cell separator from a sheet-like member, or the separator substrate 3 in a long rectangular form. The producing apparatus 5 is adapted to form the first grooves 13 and second grooves 14 continuously on the upper surface 3a of the separator substrate 3 through press-forming of the substrate 3 using forming dies 50. The forming dies 50 include an upper die 51 to be disposed on the upper side of the separator substrate 3 and a lower die 52 to be disposed on the lower side of the separator substrate 3. The upper die 51 can reciprocate in the third direction Z by mean of a lifting mechanism (not shown), while the lower die 52 is fixed.

Figure 7:
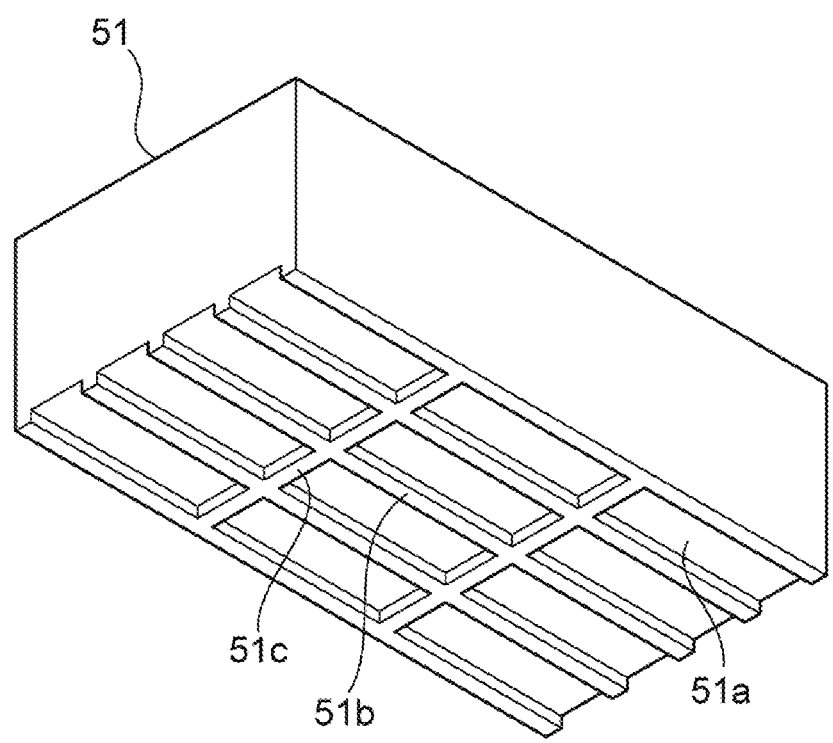
FIG. 7 is a perspective view of an upper die as seen from the underside.

FIG. 7 is a perspective view of the upper die as seen from the underside thereof. As shown in FIG. 7, the upper die 51 includes a facing surface 51a (that is, the underside of the upper die 51) that is to face the upper surface 3a of the separator substrate 3 and a plurality of first projections 51b and second projections 51c that project from the facing surface 51a toward the separator substrate 3. The first and second projections 51b and 51c intersect with each other so as to form a grid. The first projections 51b, each having a rectangular cross section, for example, are adapted to form the first grooves 13, while the second projections 51c, each having a rectangular cross section, for example, are adapted to form the second grooves 14.

Herein, as shown in FIG. 8, provided that the height of each first projection 51b projecting from the facing surface 51a is represented as A, the depth of each first groove 13 of the fuel cell separator 1 to be produced is represented as B, the thickness of the separator substrate 3 is represented as C, and the thickness of the fuel cell separator 1 to be produced is represented as D, an equation $A=B+(C-D)$ may be satisfied.

The reason for the foregoing is explained below. FIG. 8 illustrate the dimensions of each first projection of the upper die. The view on the upper side of FIG. 8 is a front view of the upper die 51, separator substrate 3, and lower die 52 illustrating their positional relations, and the one on the lower side is an enlarged cross-sectional view of the first groove 13 as seen in the first direction X. The height A of each first projection 51b projecting from the facing surface 51a indicates the distance from the facing surface 51a to the lower end of the first projection 51b in the third direction Z (see the view on the upper side of FIG. 8). The depth B of each first groove 13 of the fuel cell separator 1 to be produced indicates the distance from the top portion 12a of the projection 12 to a bottom surface 13a of the first groove 13 in the third direction Z (see the view on the lower side of FIG. 8).

When the recesses and projections are formed, the thickness D of the produced fuel cell separator typically becomes thicker than the thickness C of the separator substrate used for the production due to movement of material used. The movement of the material is considered to be caused by extrusion of the material in press-forming it using dies. Because of such movement of the material, opening rims 13c of the first grooves 13 (that is, boundaries between side walls 13b of the first grooves 13 and the top portions 12a of the projections 12) are each raised with a round angle (in other words, the opening rims 13 become rounded). When the opening rims 13c are rounded, the soft membrane electrode assembly 2 that has been brought into abutment with the top portions 12a of the projections 12 enters the first grooves 13 along the round angles, thereby clogging the first grooves 13. This may cause a problem that penetration of the reactant gas and discharge of produced water would be obstructed.

As a result of the inventor's strenuous efforts on study to overcome the aforementioned problem, it has been found that when the height A of each first projection 51b projecting from the facing surface 51a satisfies the equation $A=B+(C-D)$, the opening rims 13c of the first grooves 13 of the fuel cell separator 1 to be produced each have a substantially right angle, so that entering of the membrane electrode assembly 2 into the first grooves 13 can be suppressed, thereby preventing the membrane electrode assembly 2 from clogging the first grooves 13.

Meanwhile, a facing surface of the lower die 52 (that is, the upper surface of the lower die 52) that is to face the underside of the separator substrate 3 is flat and is adapted to have the separator substrate 3 loaded thereon. In the present embodiment, the upper die 51 has the first and second projections 51b and 51c, while the opposing lower die 52 has the flat upper surface, but the upper and lower dies 51 and 52 may be formed, as appropriate, such that the upper surface of the lower die 52 has the first and second projections, while the upper die 51 has a flat underside.

When the producing apparatus 5 with such a structure is used to form the first grooves 13 and second grooves 14, the first grooves 13 and second grooves 14 are formed on the upper surface 3a of the separator substrate 3, which has been intermittently conveyed and is loaded on the upper surface of the lower die 52, through pressing with the upper die 51 (see FIG. 6).

In the second step S12 following the first step S11, the projections 12 and recesses 11 are alternately formed, using a press (not shown), on the separator substrate 3 on which the first grooves 13 and second grooves 14 are formed. To accurately position the second grooves 14 in the bottom portions 11a of the recesses 11 in the second step, the recesses 11 and projections 12 are formed while being positioned making use of the aforementioned corresponding positioning pins and holes.

In the second step S12, the projections 12 and recesses 11 may be formed such that the material of at least the top portion 12a of each projection 12 to be brought into abutment with the membrane electrode assembly 2 stretches within 20% of the original dimensions. Such formation can realize more accurate dimensions of each first groove 13 to be disposed along each top portion 12a, thereby surely discharging produced water. The dimensional accuracy required of portions other than the top portions 12a of the projections 12, such as the inclined side wall portions 12b, is less strict as compared to that required of the top portions 12a. Thus, the material of those portions other than the top portions 12a may be allowed to stretch by 20% to 30% of their original dimensions.

Figure 9:
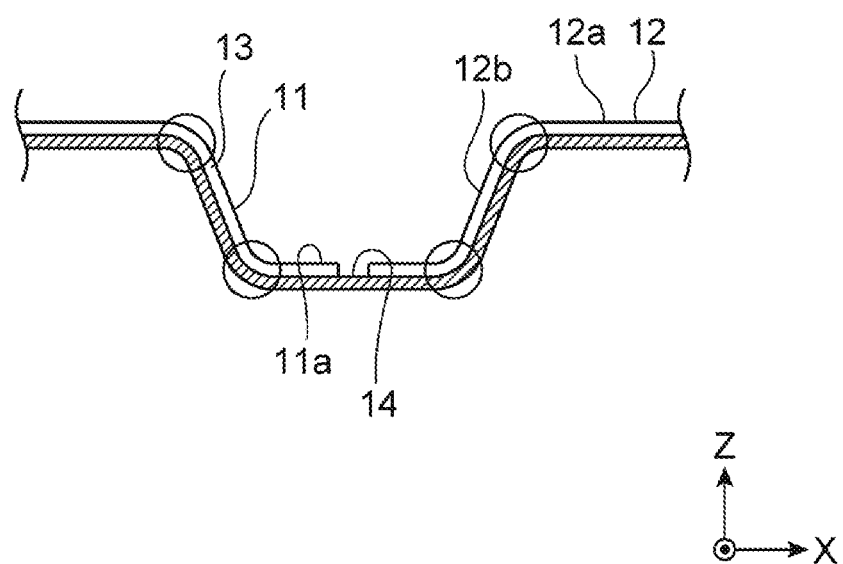
FIG. 9 is a schematic cross-sectional view illustrating portions of the fuel cell separator to be partially squashed with dies when recesses and projections are formed in a second step.

Further, as shown in FIG. 9, to reduce the load to be applied and retain the shape, in the second step S12, boundaries between the top portions 12a and the inclined side wall portions 12b of the projections 12 and between the inclined side wall portions 12b of the projections 12 and the recesses 11 (portions circled in FIG. 9) may be partially squashed with dies. Specifically, for example, the aforementioned boundaries are held between dies from their upper and lower sides and are squashed in the thickness direction. The amount to be squashed of each boundary is equivalent to the difference between the thickness D of the fuel cell separator 1 to be produced and the thickness C of the separator substrate 3 (that is, D–C). By squashing the aforementioned boundaries as such, the boundaries can be prevented from swelling due to deviation of the material used. Moreover, the opening rims 13c of the first grooves 13 of the fuel cell separator 1 to be produced each have a substantially right angle, so that the membrane electrode assembly 2 can be prevented from entering the first grooves 13.

The fuel cell separator 1 is produced through the aforementioned steps.

Since the method for producing the fuel cell separator 1 according to the present embodiment includes the first step S11 of forming the first grooves 13 and second grooves 14 on the upper surface 3a of the separator substrate 3 and the second step S12 of subsequently forming the recesses 11 and projections 12, material used for the forming is less moved as compared to when all of the first grooves 13, second grooves 14, recesses 11, and projections 12 are formed in a single step. This can reduce abrasion of dies for use in the forming, leading to extend lives of dies. Moreover, the aforementioned production method can realize more accurate dimensions of the first grooves 13, second grooves 14, recesses 11, and projections 12 to be formed.

Although the embodiments of the present disclosure have been detailed, the present disclosure is not limited thereto, and various design changes can be made without departing from the spirit and scope of the present disclosure recited in the claims.

DESCRIPTION OF SYMBOLS

1 Fuel cell separator
1a Surface
2 Membrane electrode assembly
3 Separator substrate
3a Upper surface
4, 5 Apparatus for producing fuel cell separator
11 Recess
11a Bottom portion
12 Projection
12a Top portion
12b Inclined side wall portion
13 First groove
13a Bottom surface
13b Side wall
13c Opening rim
14 Second groove
41 Upper forming roll
42 Upper backup roll
43 Lower forming roll
44 Lower backup roll
50 Forming dies
51 Upper die
51a Facing surface
51b First projection
51c Second projection
52 Lower die
411 First projecting strip section
412 Second projecting strip section

What is claimed is:

1. A fuel cell separator that is adapted to partially abut a membrane electrode assembly and is formed in a wave shape with recesses and projections alternately arranged in a first direction, the recesses forming reactant gas channels together with the membrane electrode assembly and the projections abutting the membrane electrode assembly,
wherein on a surface of the fuel cell separator that is adapted to face the membrane electrode assembly, a plurality of first grooves extending in the first direction is disposed at intervals from each other in a second direction orthogonal to the first direction, and a second groove extending in the second direction and communicating with the plurality of first grooves is disposed in a bottom portion of each recess and
wherein each first groove is provided along corrugation of the recesses and the projections so as to descend an inclined side wall portion, which is continuous with an extending downward from a top portion of each projection, pass the bottom portion of each recess, which is continuous with the inclined side wall portion, and further, ascend an inclined side wall portion of an adjustment projection and reach a top portion of the adjacent projection.

2. The fuel cell separator according to claim 1, wherein the first grooves and the second groove are coupled together with no difference in level therebetween at locations where the first grooves and the second groove communicate with each other.

3. A method for producing a fuel cell separator, the method comprising:
forming a plurality of first grooves and a plurality of second grooves, the plurality of first grooves extending in a first direction and disposed at first intervals from each other in a second direction orthogonal to the first direction, and the plurality of second grooves extending in the second direction and disposed at second intervals greater than the first intervals from each other in the first direction and communicating with the plurality of first grooves; and
forming recesses and projections so that the recesses and projections are alternately arranged in the first direction,
wherein in the forming of the recesses and projections, the recesses and projections are formed such that each second groove is positioned in a bottom portion of each recess.

4. An apparatus for producing a fuel cell separator by forming a plurality of grooves on one surface of a plate-like separator substrate by press-forming the separator substrate with a die, wherein
the die includes:
a facing surface that is to face the one surface of the separator substrate; and
projections projecting from the facing surface toward the separator substrate, the projections being adapted to form the grooves;
wherein provided that a height of each projection projecting from the facing surface is represented as A, a depth of each groove of the fuel cell separator to be produced is represented as B, a thickness of the separator substrate is represented as C, and a thickness of the fuel cell separator to be produced is represented as D, an equation $A=B+(C-D)$ is satisfied.

* * * * *